United States Patent [19]

Etherington

[11] 4,169,878

[45] Oct. 2, 1979

[54] HELICAL COMPOSTER

[76] Inventor: Alfred B. Etherington, 1909 Iwi Way, Honolulu, Hi. 96816

[21] Appl. No.: 868,287

[22] Filed: Jan. 10, 1978

[51] Int. Cl.² ............................................. C05F 9/02
[52] U.S. Cl. ......................................... 422/184; 71/9; 210/199
[58] Field of Search ............................ 23/259.1; 71/9; 210/199, 209, 220, 532 S; 422/184

[56] References Cited

U.S. PATENT DOCUMENTS

| 1,019,933 | 3/1912 | Waddington | 23/259.1 |
|---|---|---|---|
| 1,941,371 | 12/1933 | Ward | 23/259.1 |
| 1,941,499 | 1/1934 | Siems | 23/259.1 |
| 2,490,097 | 12/1949 | Seaman | 23/259.1 |
| 3,136,608 | 6/1964 | Lindstron | 23/259.1 |
| 3,178,267 | 4/1965 | Larson | 71/9 |
| 3,314,765 | 4/1967 | Abson | 23/259.1 |
| 3,357,812 | 12/1967 | Snell | 71/9 |
| 3,523,012 | 8/1970 | Pierson | 23/259.1 |
| 3,676,074 | 7/1972 | Shibayama | 23/259.1 |

FOREIGN PATENT DOCUMENTS 148177 9/1952 Australia .................................. 23/259.1

Primary Examiner—Charles N. Hart
Assistant Examiner—Ernest G. Therkorn
Attorney, Agent, or Firm—Romney, Schaap, Golant, Disner & Ashen

[57] ABSTRACT

The present invention provides a composter for the disposal of human and organic kitchen wastes through an aerobic process of decomposition wherein waste matter is moved down a helical or spiral path within a container.

19 Claims, 4 Drawing Figures

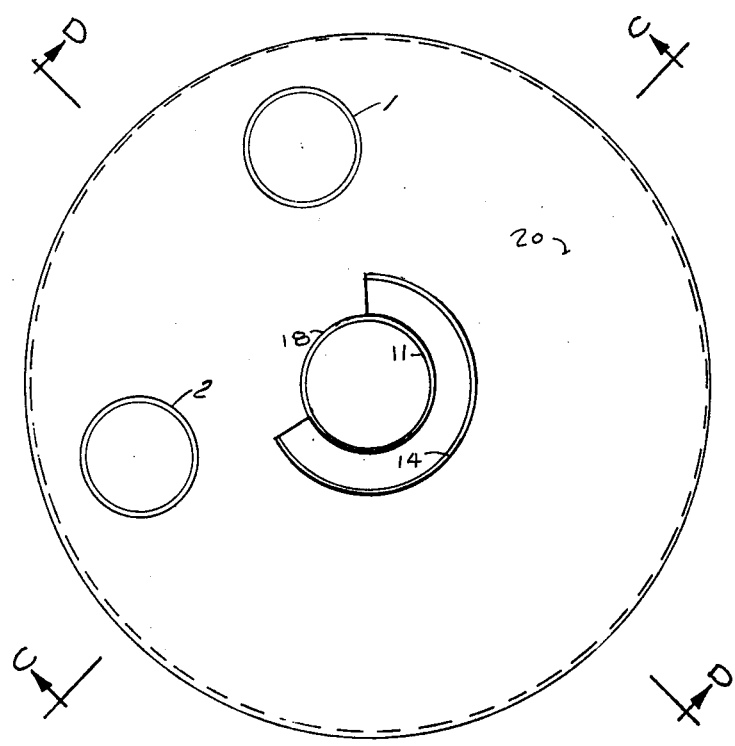
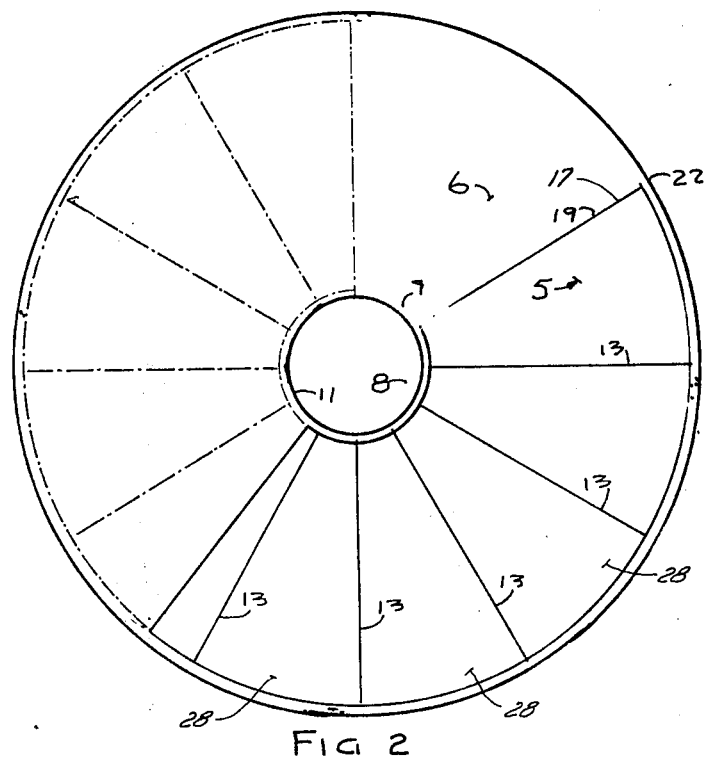

HELICAL COMPOSTER

The present invention relates to an apparatus and more particularly, relates to a device suitable for the disposal of human and organic kitchen waste. Many systems are known in the prior art, which systems are suitable for the disposal of human and/or organic wastes. Such systems range from individual ones such as septic tanks, seepage pits, and the like, to various chemical and organic treatments of waste water carried out by municipalities.

It is an object of the present invention to provide a compact integrated waste disposal unit which eliminates requirements for motors, chemicals or mechanical devices to carry out the decomposition process. It is a further object of the present invention to provide a waste disposal unit which may be buried in earth or submerged in water, the unit being encased in a water-tight and air-tight shell eliminating the danger of leaking pipes and tanks contaminating a surrounding area.

The present invention provides a waste disposal unit which employs an aerobic process of decomposition utilizing a continuous process achieved by moving waste matter down a helical or spiral path so that by the time the waste matter reaches the end of the path, all harmful bacteria and pathogens have been destroyed leaving an inert residue suitable for use as fertilizer. The aerobic decomposition of human and organic wastes is achieved by introducing a continuous flow of fresh oxygen-laden air into the mass of waste in order to accelerate decomposition.

In particular, according to one aspect of the present invention, there is provided a waste disposal unit comprising a container shell, at least one inlet situated at the top of said shell, a ramp having a substantially helical configuration extending from said inlet to a bottom of said shell, said shell including means permitting a continuous flow of fresh oxygen-laden air to enter therein, and means permitting the discharge of gaseous material therefrom.

In greater detail, the present invention provides a waste disposal unit suitable for use in dwellings, and which is adapted to provide a compact integrated human and organic kitchen waste disposal unit. The shell of the unit is constructed so as to be substantially water-tight and may be made of any suitable material including, for example, plastics, cementious materials, suitably treated metallic materials, etc. The container includes at least one inlet for the introduction of waste to the container—two or more may conveniently be provided.

According to the present invention, there is provided a waste disposal path or ramp which is in a helical or spiral configuration. This configuration permits the use of a compact disposal unit in most circumstances. The waste disposal path extends from a point proximate the top inlet in a spiral configuration to the bottom of the container. In this respect, several forms of spiral may be employed in the sense that a constant gradient is not required. Thus, the spiral ramp may comprise a plurality of "steps" or the like. Preferably, the ramp is constructed with retaining walls and/or is formed in a trough configuration to retain the wastes on the path.

Having thus generally described the invention, reference will be made to the accompanying drawings illustrating an embodiment thereof, in which:

FIG. 1 is a top sectional view of an embodiment of a waste disposal unit taken along the lines A—A of FIG. 3;

FIG. 2 is a sectional view along line B—B of FIG. 3;

Figure 3:
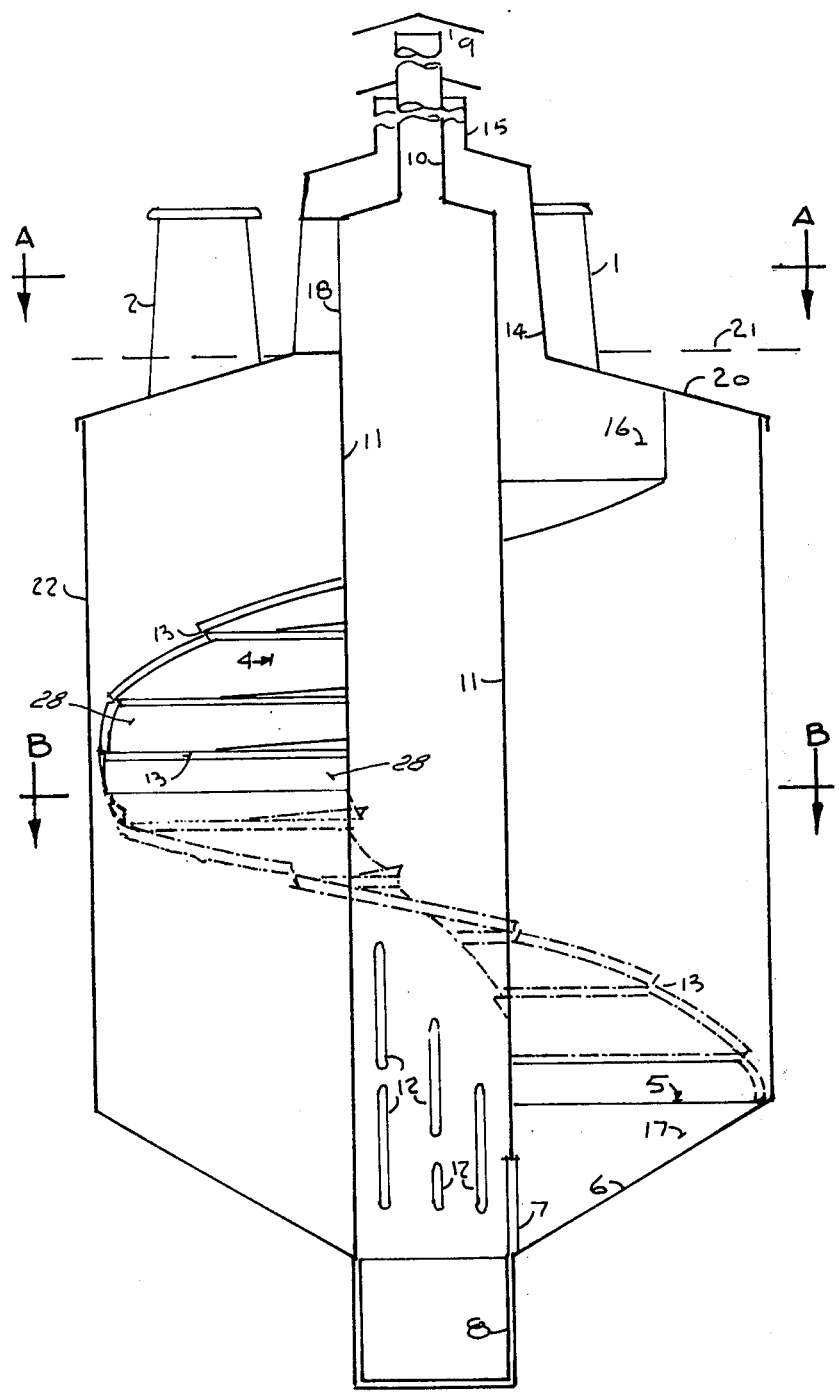
FIG. 3 is a side sectional view along line C—C of FIG. 1.

Referring to the drawings in greater detail, there is provided a container having an outer shell generally designated by reference numeral 22, and which container is of substantially water-tight construction. The main body of the container is conveniently in the form of a cylinder although other configurations may equally well be employed. First and second inlets 1 and 2 are provided in the top of the container for the introduction of waste matter as will be discussed in greater detail hereinafter.

As previously mentioned, a helical pathway is provided within the interior of the container and in the illustrated embodiment, the helical pathway comprises a plurality of "steps" generally designated by reference numeral 28. Each of the steps or shelves 28 has a downward inclination leading to a following shelf or step. In this respect, the shelves may be formed with warped upper surfaces in order to maintain a desired inclination. The inclination may vary according to the particular installation and use thereof although generally, a downward inclination in the range of between 10° and 60° may be used, while a slope between 20° and 40° has been found to be suitable.

Figure 4:
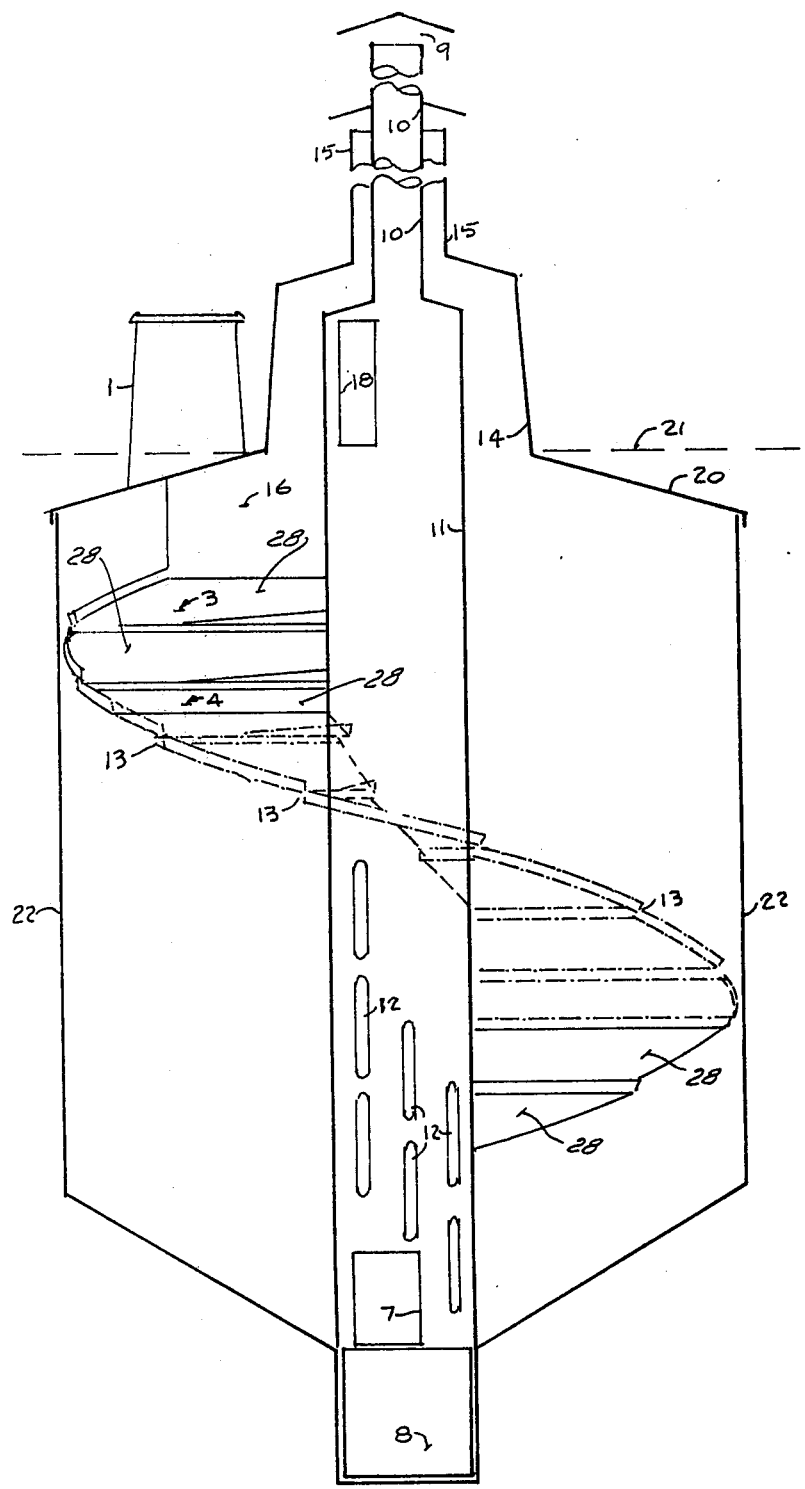
FIG. 4 is a side sectional view along line D—D of FIG. 1.

As seen in FIGS. 3 and 4, the helical pathway extends substantially to the bottom of the container wherein there is provided a conically configurated hopper 6. Located interiorly of the container is an inner tube 11 extending through shell 22 at the top portion thereof and including a discharge pipe 10. Tube 11 communicates with a bottom receptacle 8 and there is provided an opening 7 in tube 11 providing communication with hopper 6.

Fecal matter and urine are deposited through access tube 1 which is equipped with a cover or lid while organic kitchen wastes are deposited through tube 2 also equipped with a suitable cover or lid. Both human and kitchen wastes are deposited on the helical pathway at points 3 and 4 respectively. Before commencing this process, however, the helical path must be seeded with suitable bacteria necessary to carry out the aerobic decomposition process. After sufficient mass or volume of waste matter has been deposited at points 3 and 4, a gradual movement down the helical path will commence, caused by gravity and encouraged by the slope of the helix. As the initial mass moves down the helical path it is replaced at points 3 and 4 by new wastes thus creating a continuous movement down the helical path. By the time the wastes reach the bottom of the helical path at point 5, the decomposition process will be complete and the now dry residue will fall into hopper 6, pass through opening 7 and be deposited in receptacle 8. The residue may be removed through an opening 18 from receptacle 8 by any suitable means such as a bucket and hoist, an auger or by vacuum and then disposed of.

Fresh air necessary to the decomposition process is taken in through inlet 9, descends down pipe 10 into tube 11 and escapes through vent holes 12. Alternatively, or as a supplementary source, fresh air may be introduced through vertical tubes located around the outer shell 22, terminating at the helical path where the fresh air may be introduced into the wastes via tubes or shelves. Fresh air is then introduced into the waste mass through tubes open at the bottom or by creating inclined shelves or steps 13 in the helical path so that as the waste mass drops from one shelf to the next it will come into contact with the fresh air. As previously mentioned, in order to compensate for the differences of inclination of the shelves caused by the different slopes of the inner and outer radii of the shelves as measured from the center point, the shelves may be made with warped upper surfaces in order to maintain an average preferred inclination of between 25° and 35°. Alternatively, if a continuous helical path without shelves is used, small baffles radiating from the center point may be introduced at intervals at the inner portion of the helical path closest to the center point in order to slow the rate of downward movement of the wastes. The baffles may be hollow, open at the bottom and used to introduce fresh air from tube 11 into the waste mass.

Stale air which has passed through the waste is trapped above the helical path and is exhausted through plenum 14 into exhaust pipe 15 and thence at an appropriate height into the atmosphere. Alternatively, separate air supply and exhaust pipes may be located as separate contiguous pipes rather than concentrically arranged as shown in the drawings. Since heat is generated during the decomposition process, liquids in the wastes are vaporized and pass out of the exhaust system along with the stale air.

In order to separate fresh and stale air volumes, baffles are placed at the top and bottom of the helical path at positions 16 and 17.

The unit consists of an outer shell 22 with a removable top 20, an inner tube 11, a helical path, exhaust and supply air vents and ancilliary units such as waste tubes with covers, dried waste extraction mechanisms, baffles and so forth. These may be assembled in sub-groups before installation or may be installed piece by piece. Thus, maintenance and repair operations may be easily carried out after removing top cover 20. A floor 21 may be added to facilitate approach to the various access points of the unit.

The unit may be constructed of any material or materials which are sufficiently strong and rigid to retain the form of the design under full load conditions, which do not readily transmit moisture and which resist the corrosive effects of the decomposition process. These may include but are not limited to plastics, ferrocement, reinforced concrete and cement-asbestos.

If desired, an additional baffle 19, open at the bottom to allow residue to pass through, may be located at the point generally designated by reference numeral 5 extending from the inner tube 11 to the outer wall 22 and of a height sufficient to contain the waste residue in order to contain larger volumes of waste for processing before passing into hopper 6.

Naturally, the dimensions for the unit will depend on the use to which the unit is put including loading factors, etc. It is believed that such parameters can readily be determined.

It will be understood that changes and modifications may be made to the above-described embodiment without departing from the spirit and scope of the invention as defined in the following claims.

I claim:

1. A generally vertically disposed waste disposal unit comprising a container which is fixedly located so that it is non-rotatable, at least one waste inlet situated proximate the top of said container, a ramp forming a waste disposal path located to receive waste material from said inlet extending from proximate said inlet to a bottom of said container, substantially the entire surface of said ramp forming the waste disposal path being inclined downwardly from proximate said inlet to said bottom of said container and having a substantially helical configuration from proximate said inlet to said bottom of said container, said container means including means for permitting a continuous flow of fresh oxygen-laden air to enter therein, the incline of said ramp being sufficient to permit the waste material to move substantially only by the force of gravity and yet to enable sufficient surface area to be available to the oxygen-laden air so that the waste material can be composted when reaching the bottom of the container, and means permitting the discharge of gaseous material from the container.

2. A disposal unit as defined in claim 1 wherein said waste disposal path comprises a continuous ramp extending from proximate said waste inlet to the bottom of said container.

3. A disposal unit as defined in claim 2 including a plurality of baffles radiating outwardly from a generally vertically disposed inner tube about which said ramp extends.

4. A disposal unit as defined in claim 1 wherein said waste disposal path comprises a plurality of inclined shelves extending in a generally helical configuration.

5. A disposal unit as defined in claim 1 wherein said ramp is inclined at an angle of from about 20° to about 40°.

6. A disposal unit as defined in claim 1 including a pair of spaced apart inlets proximate the top of said container with each receiving different types of waste material and depositing the waste material from each of said inlets at different positions on said disposal path.

7. A disposal unit as defined in claim 1 including a generally vertically disposed center tube about which said waste disposal path extends, said center tube having a waste receiving receptacle at the bottom thereof, said container having a hopper at the bottom, said waste receptacle being located beneath said hopper, and means permitting entry of matter from said hopper to fall by gravity into said waste receptacle.

8. A generally vertically disposed waste disposal unit comprising a container which is fixedly located so that it is non-rotatable, a generally vertically disposed hollow tube extending from the top of said container to a bottom of said container, said hollow tube having a central chamber extending therethrough, an inlet opening outwardly of said container permitting fresh oxygen-laden air to enter said chamber, at least one waste inlet situated proximate the top of said container and leading into a waste material receiving compartment, a ramp forming a waste disposal path located in said waste material receiving compartment and having a substantially helical configuration extending from proximate said inlet to a bottom of said container, said ramp being inclined downwardly from said inlet to said bottom of said container said incline being sufficient to permit the waste material to move substantially only by the force of gravity and yet to enable sufficient surface area to be available to the oxygen-laden air so that the waste material can be composted when reaching the bottom of the container, said hollow tube having at least one air outlet opening communicating with said compartment for permitting a continuous flow of fresh oxygen-laden air to enter said compartment, and means permitting the discharge of gaseous material generated from the composted waste material from the container.

9. A disposal unit as defined in claim 8 wherein said waste disposal path comprises a continuous ramp extending from proximate said waste inlet to the bottom of said container.

10. A disposal unit as defined in claim 9 wherein said ramp is inclined at an angle of from between 20° and 40°.

11. A disposal unit as defined in claim 8 wherein said waste disposal path comprises a plurality of inclined shelves extending in a generally helical configuration.

12. A disposal unit as defined in claim 8 including a pair of spaced apart inlets proximate the top of said container with each receiving different types of waste material and depositing the waste material from each of said inlets at different positions on said disposal path.

13. A disposal unit as defined in claim 8 including a generally vertically disposed center tube about which said waste disposal path extends, said center tube having a waste receiving receptacle at the bottom thereof, said container having a hopper at the bottom, said waste receptacle being located beneath said hopper, and means permitting entry of matter from said hopper to fall by gravity into said waste receptacle.

14. The disposal unit as defined in claim 8 further characterized in that substantially the entire surface of said ramp forming the waste disposal path is inclined downwardly from proximate said inlet to said bottom of said container and has a substantial helical configuration from proximate said inlet to said bottom of said container.

15. The disposal unit as defined in claim 14 further characterized in that the incline of said ramp is sufficient to permit the waste material to move only by the force of gravity and yet to enable sufficient surface area to be available to the oxygen-laden air so that the waste material can be composted when reaching the bottom of the container.

16. A generally vertically disposed waste disposal unit comprising a container which is fixedly located so that it is non-rotatable, a generally vertically disposed hollow tube extending from the top of said container to a bottom of said container, said hollow tube having a central chamber extending therethrough, an air inlet on said tube outwardly of said container permitting fresh oxygen-laden air to enter said chamber, a pair of waste inlets situated proximate the top of said container and leading into a waste material receiving compartment, a ramp forming a waste disposal path located in said waste material receiving compartment extending from proximate said inlet to a bottom of said container, substantially the entire surface of said ramp forming the waste disposal path being inclined downwardly from proximate said inlet to said bottom of said container and having a substantially helical configuration from proximate said inlet to said bottom of said container, each of said waste inlets receiving different types of waste material and depositing the waste material from each of said inlets at different positions on said disposal path, the incline of said ramp being sufficient to permit the waste material to move substantially only by the force of gravity and yet to enable sufficient surface area to be available to the oxygen-laden air so that the waste material can be composted by reaching the bottom of the container, said hollow tube having at least one air outlet opening communicating with said compartment for permitting a continuous flow of fresh oxygen-laden air to enter said compartment, means permitting the discharge of gaseous material generated from the composted waste material from the container, a waste receiving receptacle at the bottom of said tube, said container having a hopper at the bottom, said waste receptacle being located beneath said hopper, and means permitting entry of matter from said hopper to fall by gravity into said waste receptacle.

17. A disposal unit as defined in claim 16 wherein said waste disposal path comprises a continuous ramp extending from proximate said waste inlet to the bottom of said container.

18. A disposal unit as defined in claim 16 wherein said waste disposal path comprises a plurality of inclined shelves extending in a generally helical configuration.

19. A disposal unit as defined in claim 16 wherein said ramp is inclined at an angle of from about 20° to about 40°.

* * * * *